Aug. 29, 1944.  J. C. SIMS, JR  2,356,894
UNIVERSAL RESONANT TYPE FATIGUE TESTING MACHINE
Filed Oct. 8, 1942  3 Sheets-Sheet 1
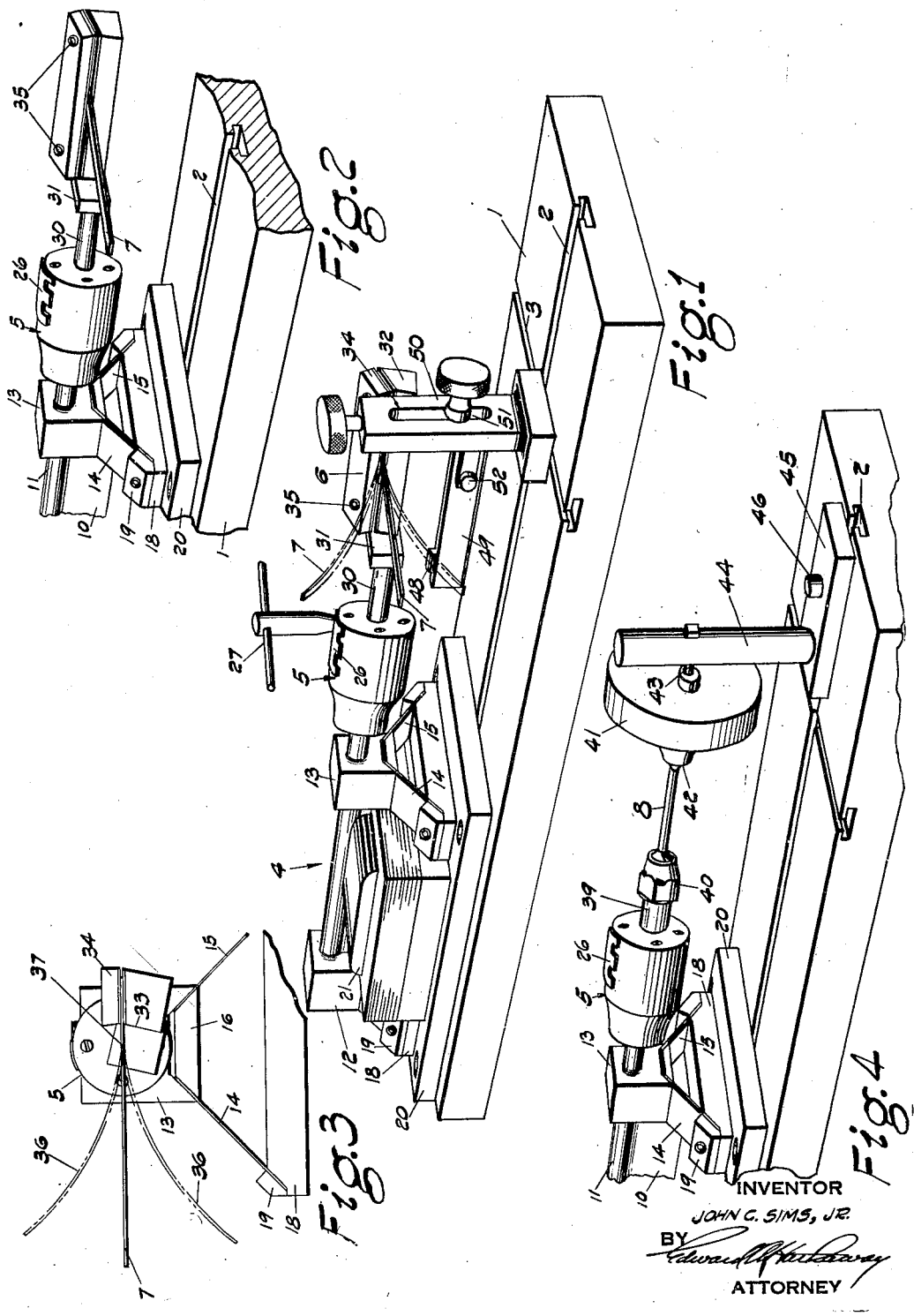
INVENTOR
JOHN C. SIMS, JR.
BY
ATTORNEY Aug. 29, 1944.  J. C. SIMS, JR  2,356,894
UNIVERSAL RESONANT TYPE FATIGUE TESTING MACHINE
Filed Oct. 8, 1942  3 Sheets-Sheet 2

INVENTOR
JOHN C. SIMS, JR.
BY
ATTORNEY

Aug. 29, 1944.  J. C. SIMS, JR  2,356,894
UNIVERSAL RESONANT TYPE FATIGUE TESTING MACHINE
Filed Oct. 8, 1942  3 Sheets-Sheet 3

INVENTOR
JOHN C. SIMS, JR.
BY
ATTORNEY

Patented Aug. 29, 1944

2,356,894

UNITED STATES PATENT OFFICE 2,356,894

UNIVERSAL RESONANT TYPE FATIGUE TESTING MACHINE

John C. Sims, Jr., Philadelphia, Pa., assignor to The Baldwin Locomotive Works, a corporation of Pennsylvania Application October 8, 1942, Serial No. 461,259

6 Claims. (Cl. 73—51)

This invention relates generally to materials testing apparatus and more particularly to resonant type fatigue testing machines.

Various types of resonant type fatigue testing machines have heretofore been proposed and used but the same have been deficient in various structural, functional or economic aspects.

It is an object of my invention to provide an improved universal resonant type fatigue testing machine that is adapted to test specimens under various forms of applied load.

Another object is to provide an improved apparatus that is adapted to make a resonant fatigue test in torsion.

A further object is to make a flexure test in such a manner that there is minimum possibility of clamping stresses being set up in the specimen from the gripping jaws between which the specimen is clamped.

A still further object is to provide an improved resonant fatigue machine that can be readily used for either flexure or torsion testing.

A more specific object is to provide a relatively compact, simple and durable resonant fatigue machine whose fundamental principles of operation and structure remain the same regardless of the type of test.

Other objects and advantages will be more apparent to those skilled in the art from the following description of the accompanying drawings in which:

Fig. 1 is a perspective of my fatigue testing machine showing a specimen undergoing a bending or flexure test;

Fig. 2 is a fragmentary perspective view with certain parts removed to show more clearly the manner of clamping a specimen during a flexure test;

Fig. 3 is a fragmentary end view of the machine showing the manner in which a flexure specimen bends about a point spaced from the point of clamping;

Fig. 4 is a fragmentary perspective view of my machine showing a torsional fatigue test;

Figure 5:
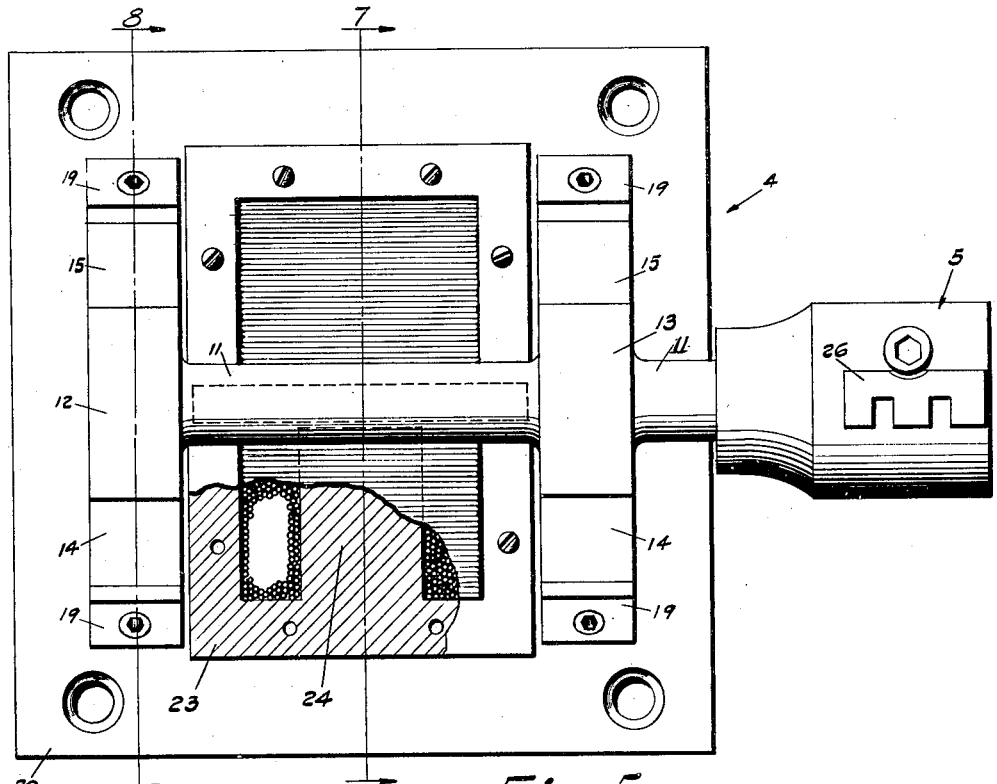
Fig. 5 is a plan view of my fatigue machine with part of the magnetic coil broken away.
Figure 6:
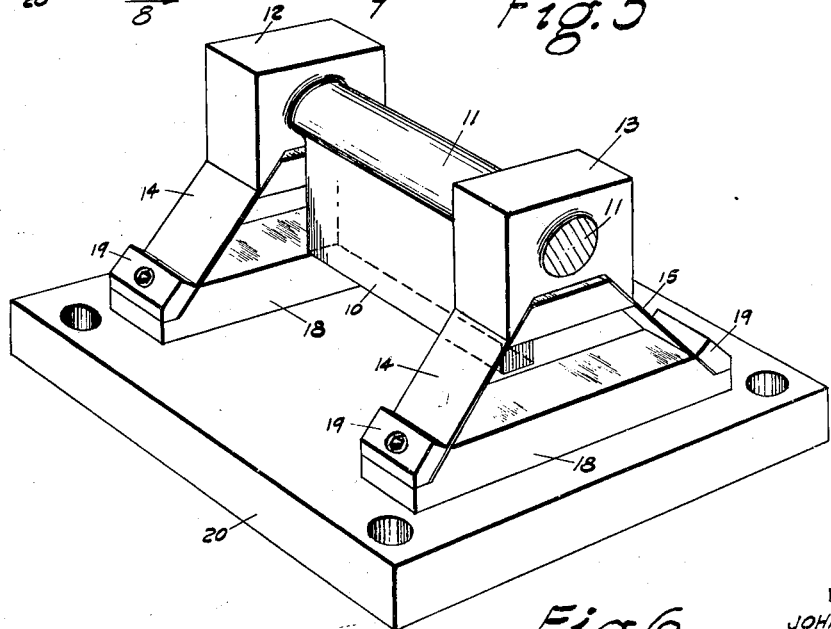
Fig. 6 is a perspective view of the vibrating armature and its pivotal supporting frame, all other parts being omitted for sake of clarity.

In the particular embodiment of the invention disclosed herein for purposes of illustration, I have provided as shown in Fig. 1 a relatively heavy frame or base 1 having preferably longitudinal and transverse T shaped anchoring slots 2 and 3. Mounted upon the base is a magnetically operated specimen exciter 4 which has a rotary vibratory action, that is, a torsional vibration. This vibration is transmitted to a chuck 5 which is adapted to support various novel specimen holders whereby different types of stress may be applied to specimens. For example, an offset clamp 6 supports a transversely extending flexure specimen 7 or as shown in Fig. 5 an axial specimen 8 may be subjected to torsional vibration.

Figure 7:
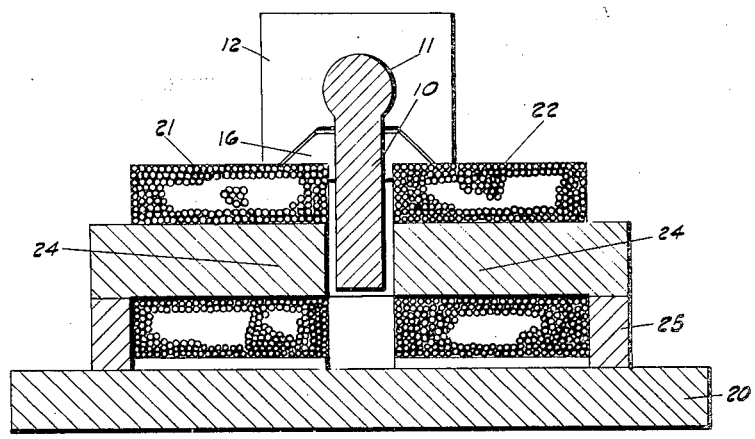
Fig. 7 is a transverse section taken substantially on the line 7—7 of Fig. 5.
Figure 8:
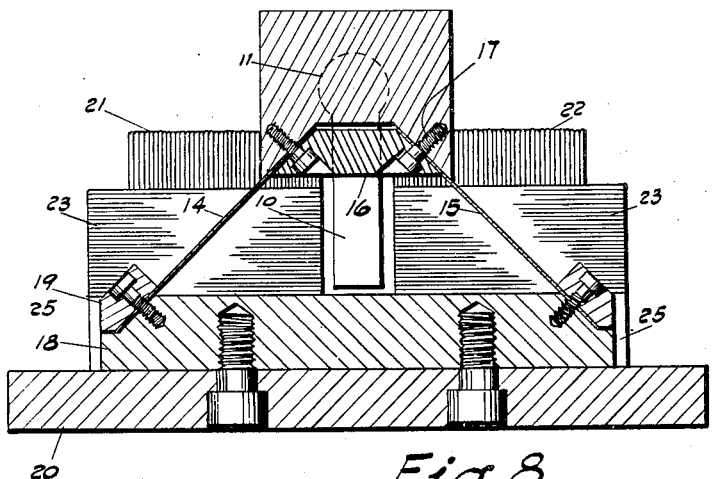
Fig. 8 is a transverse section taken substantially on the line 8—8 of Fig. 5.

The principles embodied in my improved exciter mechanism 4, as well as the manner of supporting specimens for various types of tests, employ a new mode of operation in resonant fatigue devices. One embodiment employing these improved principles consists in mounting a rotary vibratory blade or armature 10, Fig. 7, upon a horizontal shaft 11 whose ends are preferably formed integrally with blocks 12 and 13 or otherwise rigidly secured thereto in any suitable manner. Each of these blocks is supported upon relatively thin elongated flexure plates 14 and 15, Fig. 8, secured to the blocks by wedge pieces 16 and screws 17, Fig. 8, while the lower ends of the flexure plates are secured to feet 18 by clamps 19. The feet 18 are secured, in turn, to a base plate 20 which is suitably anchored to the main frame 1. It will be noted from Fig. 8 that the flexure plates 14 and 15 lie in planes which, if extended, intersect the axis of shaft 11 thereby allowing the vibratory armature blade or plate 10 to rotatably oscillate about a substantially stationary axis, it being understood that the angular vibratory movement of the plate is of extremely small magnitude so that the axis of shaft 11 remains in a substantially constant position at all times. The vibratory plate 10 extends down between a pair of electro magnets 21 and 22 each of which has a core of suitable laminated material in the form of an outside U-frame 23, Fig. 5, with an inner central projection 24 around which the windings are directly wound. The core is magnetically insulated from the base 20, Fig. 7, by a piece of suitable magnetic insulation 25 such as copper.

To transmit to a specimen the vibratory oscillations of the exciter 4 I continue shaft 11 beyond head 13 and preferably mount a chuck 5 rigidly thereon of a well-known type having opposed clamping jaws such as 26, Fig. 1, radially adjustable in a usual manner by a hand socket wrench 27 which is removed when the machine is in operation. To make a flexure fatigue test I clamp in the chuck an offset specimen grip consisting of a shank 30 secured coaxially in the chuck and having rigidly secured therewith a right angle arm 31 from which projects a longitudinal specimen jaw 32 whose inner edge 33, Fig. 3, is offset from the axis of rotation. The specimen 7 of any suitable shape specifically shown as a thin flat member is held between jaw 32 and a removable jaw 34, Fig. 1, by suitable screws or studs 35. One of the advantages of this offset specimen grip or support is the feature that as the specimen is flexed back and forth, as shown by the dotted lines 36, Fig. 3, the specimen bends about an axis 37 which is believed to substantially coincide with that of the axis of rotation. This point of flexure is spaced substantially away from the inner edges of clamping jaws 32 and 34 and hence the specimen is believed to be entirely free, at the point of its maximum fatigue stress, of any clamping stresses set up in the specimen by the clamping jaws.

The versatility of apparatus employing my improved principles of operation is further illustrated in Fig. 5 where I accomplish a torsional fatigue test in a resonant vibrating manner. A specimen 8 of any suitable cross-sectional form, preferably circular, has one end secured preferably in a suitable auxiliary chuck head 40 provided with a shank 39 which in turn is clamped in chuck 5. Rigidly secured on the other free end of the specimen is a suitable mass 41, preferably a circular disc, disposed coaxially with the axis of specimen 8 and the rotary vibratory axis. The disc is of predetermined diameter and mass so that a resonant torsional vibration will be set up in specimen 8 during vibration of chuck 5.

The mass 41 may be secured to the specimen in any suitable manner preferably by being formed as an integral part of a chuck 42 adapted to be releasably clamped to specimen 8. The outer side of mass 41 is provided with a coaxially tapered centering seat for receiving a stationary center pin 43, this pin being mounted in a post 44 projecting upwardly from and rigidly secured to a foot 45 that can be releasably secured on base 1 by a suitable T head bolt and nut 46. The T head bolt is slidable in the longitudinal T slot 2. With the apparatus set up as shown in Fig. 4, the rotatable free right end of specimen 8 is held in a constant axial position by the stationary center pin 43 while the flexure supporting plates 14, 15 hold the inner end of the specimen in constant axial positions whereby at the desired rate of frequency necessary for the weight and specimen to acquire a given resonant torsional vibration until the specimen fails under fatigue.

My improved apparatus readily lends itself to changing from flexure to torsional tests merely by clamping either form of specimen support in chuck 5. The whole operation is simple, direct and highly effective and is capable of a wide range of vibration in accordance with an electrical circuit described more fully in an application of mine executed and filed of even date herewith entitled Control for universal resonant type fatigue testing machine.

As disclosed in said other application of mine, I have provided an improved capacity pick-up for determining when a specimen fails as well as to control the amplitude and frequency of vibration particularly in the flexure type test. This pick-up is shown as a metal strip or button 48 disposed beneath the lowest point of specimen swing and supported on an arm 49 that is vertically adjustable on a standard 50 through a pin and slot connection 51. This arm is also longitudinally adjustable by a suitable pin and slot connection 52. The standard 50 is suitably clamped on base 1 by usual T head bolts and nuts disposed in either T slots 2 or 3 and accordingly is adjustable transversely or longitudinally on base 1. As explained in my said other application, the specimen 7 will flex at an amplitude great enough to closely approach capacity pick-up button 48 but without touching the same. The details of operation of the capacity pick-up 48 need not be described herein as it forms a part of my other application.

Figure 9:
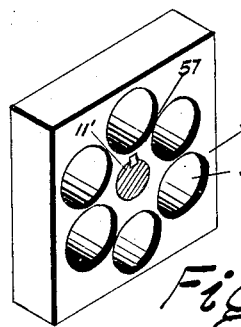
Fig. 9 is a perspective of a modified form of oscillatory support for the vibrating armature.

In the modification shown in Fig. 9, the two sets of diagonal flexible supporting strips 14 and 15 together with their heads 12 and 13 are replaced by solid metal blocks 55. These blocks have a series of openings 56 spaced sufficiently close together to form thin walled flexure sections 57 which broadly lie in radial planes intersecting the rotary vibratory axis. The shaft of the armature plate 10 is secured to the center of blocks 55 as shown at 11'.

From the foregoing disclosure, it is seen that I have provided not only an improved structure for producing resonant fatigue tests, but a structure that employs new principles of operation that are conducive to eliminating the effects of clamping stresses on the specimen during a flexure test and is adapted to produce resonant torsional fatigue tests, all with a single exciter mechanism that is relatively inexpensive and simple as well as being rugged and compact, together with having a high degree of stability of operation, accuracy and sensitivity.

It will of course be understood that various changes in details of construction and arrangement of parts may be made by those skilled in the art without departing from the spirit of the invention as set forth in the appended claims.

I claim:

1. A resonant fatigue testing apparatus for materials comprising, in combination, an exciter having a member with a rotary vibratory action, means for supporting said exciter member in its operative position independently of a specimen to be tested a specimen grip adapted to hold one end of the specimen while the other end is free to move in accordance with the rotary vibratory motion imparted thereto, and means for vibrating said grip by said exciter member so that the rotary vibratory movement is imparted to the specimen from its held end while its free end is adapted to move as aforementioned.

2. A resonant fatigue testing apparatus for materials comprising, in combination, an exciter having a member with a rotary vibratory action, means for supporting said exciter member in its operative position independently of a specimen to be tested and specimen gripping means connected to and actuated by said exciter member and adapted to grip a flexure specimen so that it extends laterally from and across the rotary vibratory axis and is gripped at one end at a point offset from said axis so that the specimen is free at its other end and is also free as it passes across said axis.

3. A resonant fatigue testing apparatus for materials comprising, in combination, an exciter having a member with a rotary vibratory action, means for supporting said exciter member in its operative position independently of a specimen to be tested, a specimen grip adapted to hold one end of the specimen while the other end is free to move in accordance with the rotary vibratory motion imparted thereto, means for vibrating said grip by said exciter member so that the rotary vibratory movement is imparted to the specimen from its held end while its free end is adapted to move as aforementioned, a mass on the other end of the specimen, and means for laterally steadying said latter end of the specimen upon which said mass is mounted.

4. A resonant fatigue testing apparatus for materials comprising, in combination, electro-magnetic means in which an alternating magnetic field is created, a pivotally mounted armature plate adapted to have a rotary vibratory action when subjected to the alternating magnetic field, means for connecting a specimen to said armature plate so as to subject the specimen to a resonant fatigue vibration maintained by the vibratory action of said plate, and flexure members fixedly supported at one of their ends while their other ends support said armature plate, said flexure members extending in directions that intersect substantially at the rotary vibratory axis which remains in a substantially constant position.

5. A resonant fatigue testing apparatus for materials comprising, in combination, electro-magnetic means in which an alternating magnetic field is created, a pivotally mounted armature plate adapted to have a rotary vibratory action when subjected to the alternating magnetic field, means for connecting a specimen to said armature plate so as to subject the specimen to a resonant fatigue vibration maintained by the vibratory action of said plate, and two sets of flat flexure plates fixedly supported at one of their ends while their other ends support said armature plate, said flexure members being located respectively at opposite ends of the armature plate and the flexure plates of each set lying in planes which intersect the vibratory axis of said armature plate.

6. A resonant fatigue testing apparatus for materials comprising, in combination, electro-magnetic means in which an alternating magnetic field is created, a pivotally mounted armature plate adapted to have a rotary vibratory action when subjected to the alternating magnetic field, means for connecting a specimen to said armature plate so as to subject the specimen to a resonant fatigue vibration maintained by the vibratory action of said plate, and two sets of flat flexure plates, said sets of flexure plates being located respectively at opposite ends of said armature plate and lying in planes which intersect the vibratory axis of the armature plate, means for rigidly connecting said armature plate to the adjacent ends of said flexure plates, and means for rigidly securing the other ends of said flexure plates against movement whereby said flexure plates support said armature plate and also permit the rotary vibratory movement thereof.

JOHN C. SIMS, Jr.